(12) United States Patent
Tumback

(10) Patent No.: US 8,151,961 B2
(45) Date of Patent: Apr. 10, 2012

(54) DOUBLE CLUTCH FOR A DOUBLE-CLUTCH TRANSMISSION

(75) Inventor: Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 12/223,548

(22) PCT Filed: Jan. 16, 2007

(86) PCT No.: PCT/EP2007/050394
§ 371 (c)(1),
(2), (4) Date: Feb. 17, 2009

(87) PCT Pub. No.: WO2007/096212
PCT Pub. Date: Aug. 30, 2007

(65) Prior Publication Data
US 2009/0301835 A1 Dec. 10, 2009

(30) Foreign Application Priority Data

Feb. 22, 2006 (DE) .......................... 10 2006 008 226

(51) Int. Cl.
*F16D 21/06* (2006.01)
*F16D 48/06* (2006.01)

(52) U.S. Cl. .................. 192/48.2; 192/48.8; 192/70.23; 192/84.6

(58) Field of Classification Search ................. 192/48.2, 192/48.8, 84.6; 701/67, 68; 477/5, 8, 9, 477/13
See application file for complete search history.

(56) References Cited

U.S. PATENT DOCUMENTS

| 6,292,732 | B1 | 9/2001 | Steinmetz et al. | |
| 6,668,994 | B2 * | 12/2003 | Hirt | 192/48.8 |
| 6,722,483 | B2 * | 4/2004 | Damm et al. | 192/48.8 |
| 7,338,403 | B2 * | 3/2008 | Puiu | 475/223 |
| 7,387,590 | B2 * | 6/2008 | Dreher | 477/77 |
| 7,546,914 | B2 * | 6/2009 | Schranz et al. | 192/48.4 |
| 2005/0205376 | A1 | 9/2005 | Kemper | |
| 2007/0080004 | A1 * | 4/2007 | Pfund | 180/65.2 |

FOREIGN PATENT DOCUMENTS

| DE | 199 03 554 | 8/2000 |
| DE | 103 13 435 | 10/2003 |
| DE | 103 16 419 | 11/2003 |
| EP | 1 369 613 | 12/2003 |
| FR | 2 810 708 | 12/2001 |
| JP | 2001-132779 | 5/2001 |
| JP | 2003-97597 | 4/2003 |

* cited by examiner

*Primary Examiner* — David D Le
*Assistant Examiner* — Jude Agendia
(74) *Attorney, Agent, or Firm* — Kenyon & Kenyon LLP

(57) ABSTRACT

A double clutch for a double-clutch transmission includes a first clutch, a second clutch, a first electric actuator, and a second electric actuator. The first electric actuator acts on a cam that activates both clutches and controls a clutch shift operation between the first and the second clutch. The first electric actuator additionally acts on a cam activating one of the two clutches.

11 Claims, 3 Drawing Sheets

FIG. 2.1
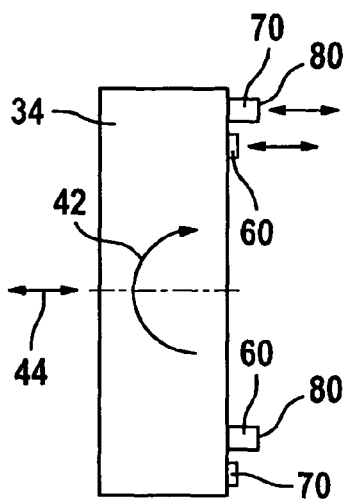
FIG. 2.2
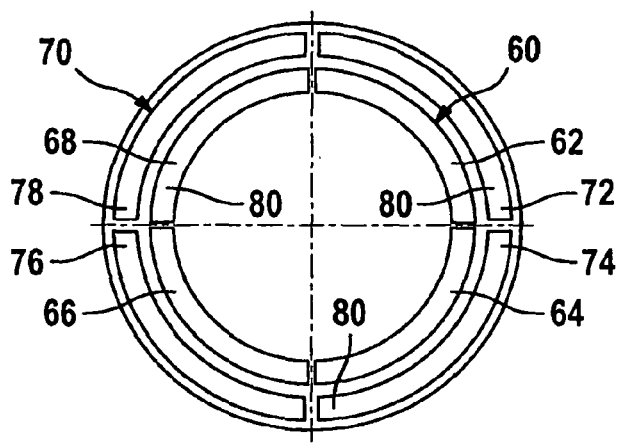
FIG. 3
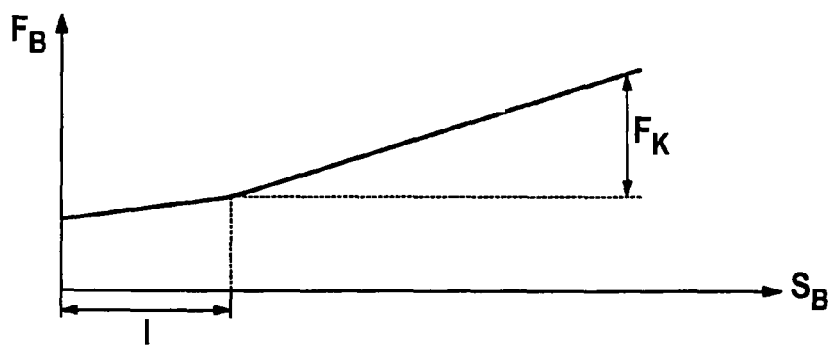
FIG. 4
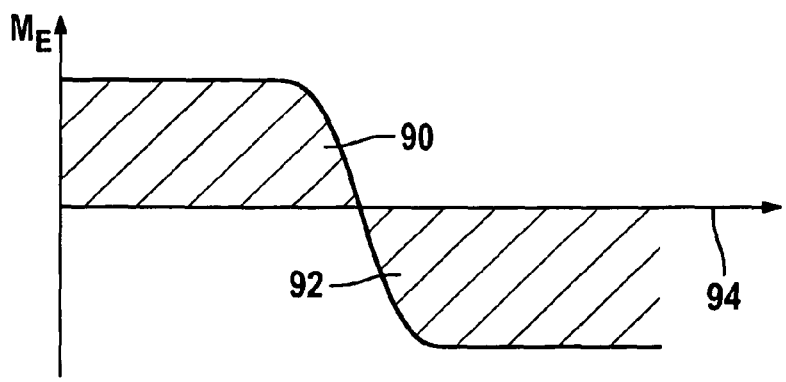

DOUBLE CLUTCH FOR A DOUBLE-CLUTCH TRANSMISSION

BACKGROUND OF THE INVENTION

1. Field of the Invention

The present invention relates to a double clutch arrangement for a double-clutch transmission.

2. Description of Related Art

Double-clutch transmissions that are used for driving vehicles and are made up of two subunits that each have a main clutch are known from the related art. The main clutches mentioned are actuated by a hydraulic actuator system. In addition to this, it is known to use electric actuators such as electric motors and suitable kinematics assigned to them to actuate clutches. One clutch is actuated respectively, independently of the other, by a motor having correspondingly designed kinematics assigned to it.

A motor-vehicle drive train and a method for controlling it is described in published German patent document DE 199 03 554. The motor-vehicle drive train includes an electronic control device, a variator, and at least one frictionally engaged clutch. The variator has a continuous drive element that is looped around two drive wheels for continuously variable drive translation. The continuous drive element is in frictional contact with the two drive wheels, the control device being designed such that the safety factor against slipping clutches is constantly held down to the same extent as the variator's safety factor against slipping of the continuous drive element relative to its drive wheels. Given a torque acting from the output end of the drive train into the drive train, depending on its value, either neither the clutch nor the variator shifts into slipping operation, or only the clutch, but never the variator. An adaptation of the engagement pressure of the clutch to friction values of the frictional engagement elements that change over time takes place in predetermined periods. Prior to each adaptation of the clutch engagement pressure to the friction values of the frictional engagement elements of the clutch, the control device automatically checks whether predetermined operating conditions exist for the implementation of such an adaptation, and this adaptation is implemented only if the predetermined operating conditions exist.

U.S. Pat. No. 6,292,732 B1 refers to a method for regulating the fluid level of a closing clutch of automatic transmissions. To determine the right time to engage the clutch, the volume of hydraulic fluid added is determined and compared to a reference volume. In the event of unclean gear shift operations, the reference volume can be reset during the shifting. The pump speed, the type of gear shift operation, the hydraulic fluid temperature and the charging pressure are taken into account in determining the volume flow for filling the engaging clutch of the automatic transmission.

In the initially mentioned clutches that are actuatable by electric motors, the electric motors are constantly supplied with current not only for engaging the clutches, but also for keeping the clutches engaged. The result is a corresponding dimensioning of the electric motors, and the required power electronics. The clutches known from the related art that are controlled by electric motors must ensure that each of the two clutches of the double-clutch transmission is able to be completely engaged independently of the other, each by one electric motor. To this end, each of the two electric motors that are to be provided must be able to apply the full engagement force, which makes correspondingly powerful and therefore expensive electric motors necessary. In the case of an error, both clutches, which are each driven by an electric motor, open so that the drag torque of the combustion engine is no longer available and the engine brake is not effective. In this way, on the one hand a blocking of the transmission is indeed prevented, but on the other hand the engine brake is switched off.

A BRIEF SUMMARY OF THE INVENTION

An objective of the present invention is to provide a double clutch that is actuated by an electric motor, whose actuation is simplified for one thing and whose actuation in particular only requires low actuating forces.

To this end, it is provided to equip a double clutch with a first electric motor and a second electric motor. The double clutch according to the present invention includes a curved body on which one lift curve is mounted for each of the two clutches to be actuated respectively. To reduce the surface pressure that acts on these lift curves, each of the two lift curves is subdivided into multiple identically designed segments. Each of the curve segments forms a contact surface for one contact element for the respective clutch springs, which are each mechanically linked to the assigned clutch.

The cam controls the positions of the clutch springs and thereby the forces on the clutches via the progression of the elevations on the lift curves. The cam of the double clutch is rotated by one of the two electric motors and thus controls a clutch shift operation. The electric motor controlling a clutch shift operation is coupled with the cam such that in the end positions of the travel path of the cam, one clutch is engaged, while the other clutch stands disengaged. If only the first electric motor controlling the clutch shift operation is started, then a clutch shift is carried out from one clutch to the other. The overlapping of the clutches takes place after a specified sequence, the sequence being able to be adapted as a function of the driving status by actuating both electric motors. During a clutch shift operation, one clutch disengages while the other engages.

Furthermore, the second electric motor, which imparts a translatory motion to the cam, is assigned to the double clutch. The translatory motion imparted to the cam by the second electric motor equally varies the positions of the clutch springs of both clutches. The positions of the clutch springs influence the actuation forces at the two clutches. The second electric motor controlling the translatory motion controls the total torque that is able to be transmitted via the double clutch. Accordingly, the positions of the clutch springs and thus the clutch forces are optimally adjusted to full-throttle or part-throttle operation. Where necessary, the second electric motor may perform a slip control of the respectively engaged clutch of the two clutches of the double clutch. Additionally, the second electric motor also controls or regulates the initial drive operation. Through a joint triggering of both electric motors of the double clutch during the clutch shift operation, a modified freely selectable sequence of the clutch shift operation that deviates from the specified sequence of the clutch shift operation may be set. Thus, the sequence of the clutch shift operation may be optimized as a function of the driving status of the vehicle.

In the double clutch provided according to the present invention that is actuated by two electric motors, an advantage results to the effect that the electric motor that controls the clutch shift operation may be given smaller dimensions with regard to the required performance to be applied by it. Furthermore, in the double clutch proposed according to the present invention, the necessity of a constant energy supply to both electric motors is eliminated. This is advantageous with regard to the performance electronics that are required in certain instances and the dimensioning of both electric motors. Furthermore, the solution of the double clutch proposed according to the present invention makes it possible to ensure that, the "engine brake" safety aspect remains effective even in the event of a system failure. Additionally, the arrangement according to the present invention ensures that both clutches of the double-clutch transmission are never completely engaged due to a malfunction and the transmission damaged.

A BRIEF DESCRIPTION OF THE SEVERAL VIEWS OF THE DRAWING

FIG. 1 shows a cross-section of the double clutch provided according to the present invention.

FIG. 2.1 shows a lateral view of the cam having lift curves.

FIG. 2.2 shows a top view of the cam shown in the representation in FIG. 2.1, in which the lift curves for the respective clutches are subdivided into curve segments.

FIG. 3 shows the exemplary characteristic of actuating force $F_B$ of a clutch over actuating path $S_B$ of the clutch spring.

FIG. 4 shows a variant of the characteristic of the torque at the electric motor generating the clutch shift operation.

DETAILED DESCRIPTION OF THE INVENTION

Figure 1:
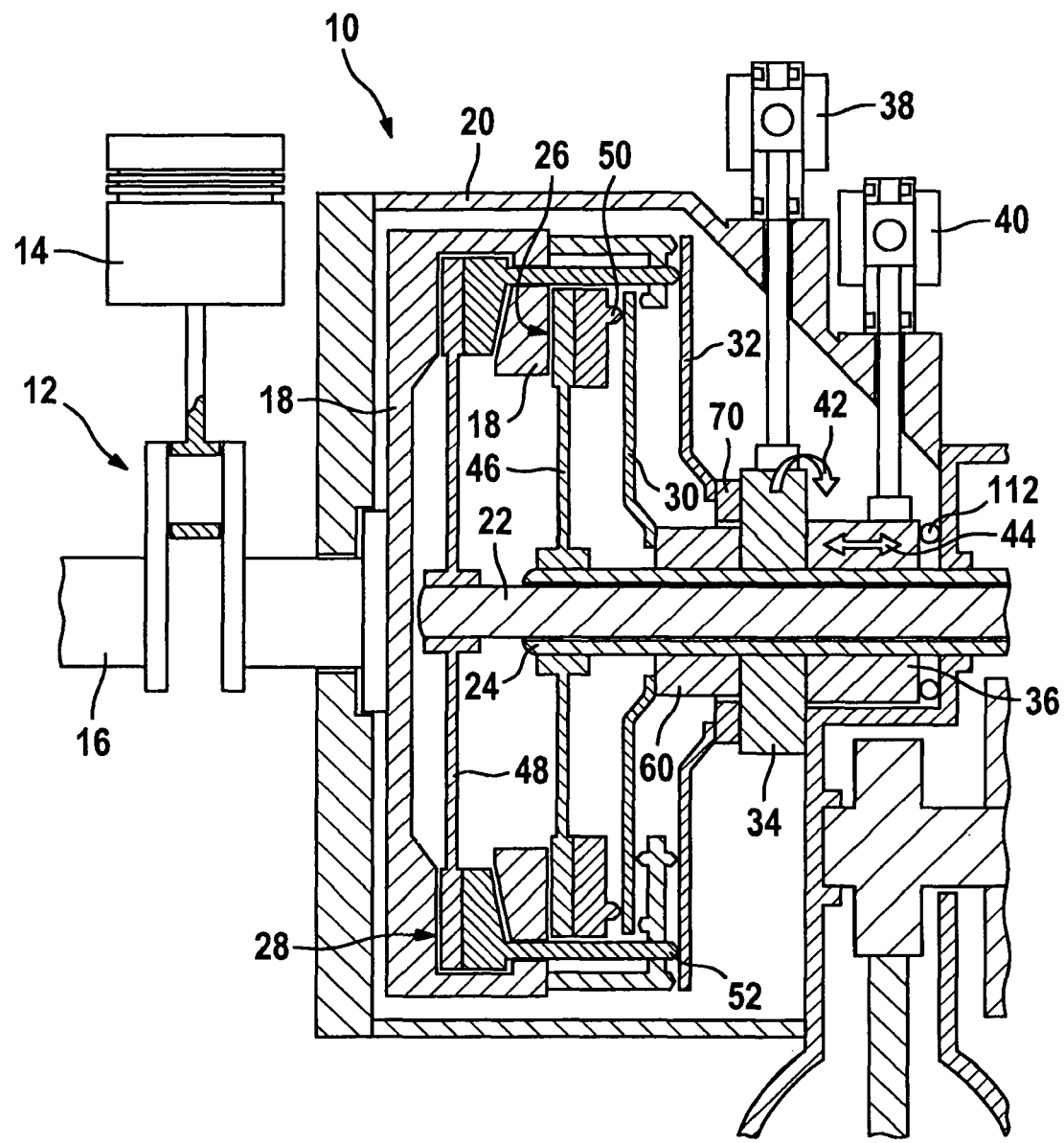

A schematic cross-section of the double clutch according to the present invention is illustrated in the representation shown in FIG. 1.

A double-clutch transmission, including two subunits, to each of which one clutch is respectively assigned, transmits the torque generated in a combustion engine 12 to a drive shaft 22 of the first subunit or a drive shaft 24 of the second subunit that surrounds drive shaft 22. The combustion engine is usually a multi-cylinder combustion engine, whether it be self-igniting or a combustion engine having an externally supplied ignition, indicated here by a piston 14 whose vertical motion is transformed into a rotational motion via a crankshaft 16. The rotational motion of crankshaft 16 of combustion engine 12 is transmitted to a clutch block 18 of double clutch 10 that is surrounded by a housing 20.

A first clutch 26 and a second clutch 28 of a double clutch 10 of a double-clutch transmission 10 are located within housing 20 of double-clutch transmission 10. First clutch 26 is situated toward the inside, while second clutch 28 is situated toward the outside. Both clutches 26, 28 of double clutch 10 are accordingly accommodated concentrically to each other within housing 20 of the double-clutch transmission. Clutches of equal size may also be used.

A first clutch spring 30 is assigned to first clutch 26, while second clutch 28 is acted upon via a second clutch spring 32. First clutch spring 30 acts upon a bearing 50 of first clutch 26, which in turn braces itself on clutch block 18. Independently of this, second clutch spring 32 presses on a bearing 52 of second clutch 28. Clutch block 18 of the double-clutch transmission is accordingly acted upon by both clutches 26, 28 of double clutch 10 in the engaged state.

For the sake of completeness, it is mentioned here that first clutch 26 includes a first clutch disk 46, and second clutch 28 has a second clutch disk 48. Second clutch disk 48 of the second outer clutch 28 is, as implied by FIG. 1, enclosed by clutch block 18.

A first electric drive 38 and a second electric drive 40 are provided for actuating both clutches 26, 28. Cam 34 shown in FIG. 1 is moved by first electric drive 38 in a rotating fashion (cf. arrow 42) around the axis of drive shafts 22, 24 in both directions of rotation. Using first electric drive 38, the clutch shift operation between first clutch 26 and second clutch 28 is controlled as a function of the progression of the lift curves 60, 70 on cam 34. First clutch spring 30 is in contact with a first lift curve 60, and second clutch spring 32 is in contact with an additional second lift curve 70 on cam 34 via a sphere-shaped transmission element, for example. If first electric drive 38, which is provided for a clutch shift operation, is actuated, cam 34 rotates in accordance with the rotational path indicated by arrow 42, whereby first lift curve 60 and second lift curve 70 are moved in a rotary manner. Since the mentioned, for example, sphere-shaped, transmission elements of first clutch spring 30 or second clutch spring 32 run on the contact surfaces of first lift curve 60 or second lift curve 70 not shown in FIG. 1, the initial force acting on first clutch 26 and second clutch 28 is modified by a rotating motion of cam 34.

The positions of the respective clutch springs 30 and 32 respectively, and thus clutch force $F_K$ on clutches 26 and 28 respectively, are thus influenced by the rotation of cam 34. While first electric drive 38 carries out the rotational adjustment of cam 34 and thus controls a clutch shift operation between first clutch 26 and second clutch 28, when the additional, second electric drive 40 is actuated, a translatory motion, shown by double arrow 44, of a sleeve 36 takes place. Sleeve 36 is permanently coupled to cam 34, at least with regard to the translatory motion. If the additional, second electric drive 40 is triggered, cam 34, on which lift curves 60 and 70 are respectively configured, is moved in translatory direction via translatory motion 44 of sleeve 36. This influences both the positions of first clutch spring 30 and of second clutch spring 32 and thus also the actuating forces on both clutches 26 and 28 of double clutch 10 respectively.

To remove load from the mentioned first electric drive 38, which is used for a clutch shift operation between first clutch 26 and second clutch 28 of double clutch 10, one of the two clutches 26 or 28 is disengaged and the remaining of the two clutches 26 or 28 is engaged in equal measure. The spring energy stored in clutch spring 30, 32 of the clutch of the two clutches 26 and 28 to be disengaged respectively is used to load the clutch spring 30, 32 that is assigned to the respective engaging clutch of the two clutches 26, 28. For an optimal design of this procedure, contact surfaces 80 of lift curves 60, 70 shown in FIGS. 2.1 and 2.2 are optimized according to the following equation:

$$\frac{\text{Change in Energy}}{\text{Angle of Clutch Shift Motor}} = const.$$

This means that first electric drive 38 producing the clutch shift operation between the two clutches 26, 28 of double clutch 10 of the double-clutch transmission is rotated by a particular angle, whereby a corresponding amount of energy is expended to engage one of the two clutches 26, 28. However, at the same time, the same amount of energy from the disengage operation of the respective other of the two clutches 26, 28 is released. This means that apart from the system friction, no energy is required to rotate first electric drive 38.

A side or a top view of the cams shown schematically in FIG. 1 is illustrated in the representations shown in FIGS. 2.1 and 2.2.

It can be gathered from the representation shown in FIG. 2.1 that cam 34 has a second lift curve 70 extending on the outer side and a first lift curve 60 situated concentrically to it, but radially farther inward, on its front sides facing clutch 26 and 28 respectively. Cam 34 is able to be moved in a rotating manner around drive shaft 22 of the first subunit and around drive shaft 24 of the second subunit around axis 42. Additionally, cam 34, as indicated in FIG. 1, is able to be shifted in translatory direction 44 via a sliding sleeve 36. It can be gathered from the side view shown in FIG. 2.1 that first, inner lift curve 60 for activating first clutch 26, and second lift curve 70 for activating second clutch 28 each have different profiles. In the side view shown in the representation in FIG. 2, the different profiles are indicated by the different heights of contact surfaces 80. First clutch spring 30 and second clutch spring 32 brace themselves on contact surfaces 80 of first lift curve 60 or second lift curve 70, via the mentioned, for example, sphere-shaped transmission elements, thus making it possible to influence the clutch forces.

It can be gathered from the top view of cam 34 shown in FIG. 2 that the first, inner lift curve 60 for actuating first clutch 26 has, for example, four curve segments 62, 64, 66 and 68 for reducing the surface pressure that occurs. Analogously, second lift curve 70, which is situated radially outwards, for actuating second clutch 28 also includes multiple segments, for example, four, which are indicated by reference symbols 72, 74, 76 and 78. Preferably one, for example, sphere-shaped transmission element of first clutch spring 30 for actuating first clutch 26 runs on each of the curve segments 62, 64, 66 and 68 of first lift curve 60, while one, for example, sphere-shaped transmission element of second clutch spring 32 for actuating second clutch 28 rolls on each curve segment 72, 74, 76, 78 of the second, radially outward lift curve 70. In the top view shown in the representation in FIG. 2.2 the respective contact surfaces of individual segments 62, 64, 66 and 68 of first lift curve 60 and curve segments 72, 74, 76, 78 of second, radially outward second lift curve 70 are assigned reference symbol 80. Lift curves 60 and 70 are oriented in opposite directions so that the highest elevations of curve 60 respectively stand opposite the lowest elevations of curve 70 and vice versa.

The characteristic of the actuation force of a clutch plotted over the actuating path of the clutch spring is illustrated in the representation shown in FIG. 3.

In the representation shown in FIG. 3, the respective actuating force of one of the two clutches 26 or 28 is denoted by $F_B$. The actuating path of the respective clutch spring 30, 32 is represented by $S_B$. To be able to use the energy stored in clutch springs 30 or 32 of the respectively engaged clutch as completely as possible during a clutch shift from one of the clutches 26 or 28 to the respective other, and in this way to minimize the energy to be expended in electric motors 38 and 40, clutch springs 30 and 32 are preloaded. This means that clutch springs 30 and 32 apply a force to cam 34 even if clutches 26 and 28 are completely disengaged. This is achieved either through an additional compression spring 112 or through a suitable design and clamping of clutch springs 30 and 32. The characteristic of compression spring 112, or also of multiple compression springs 112, or of the design and the clamping of clutch springs 30 and 32 determines the flow of force in free travel 1 to the contact point of clutches 26 and 28, at which clutches 26, 28 begin to transmit torque. The subsequent force increase until the complete engaging of the clutch is determined by the design of the clutch springs 30, 32.

The representation shown in FIG. 4 shows a possible variation of the torque characteristic at the electric drive provided for the clutch shift operation relative to the previously described design variant.

In the representation shown in FIG. 4, a variant for torque $M_E$ of first electric drive 38 provided for the clutch shift operation is plotted over rotational angle 94 of first electric drive 38. Assuming a non-self-locking coupling to first electric drive 38 in the unenergized state of this drive, the acting spring forces move cam 34 into one of the end positions of rotational angle 94. This is achieved by modifying the curve or the profile of lift curves 60, 70 or of their curve segments 62, 64, 66 and 68 or 72, 74, 76 and 78 in a manner that deviates from the approach described above. In this case, the change in energy ΔE over rotational angle 94 is no longer constant. Rather, as indicated in FIG. 4, a ramp-shaped transition sets in between drive area 29 and entrainment area 92 with regard to first electric drive 38, while in the formulation $$\frac{\text{Change in Energy}}{\text{Angle of Clutch Shift Motor}} = const.$$

change in energy ΔE over rotational angle 94 corresponds to a horizontal straight line.

Torque $M_E$, which is adjusted via this modification of first and second lift curve 60 and 70 respectively is preferably greater than the friction torque that is generated by clutches 26 and 28 respectively to ensure a reliable further rotation or backward rotation of cam 34 without actuation by first electric drive 38. This ensures that a defined, safe state is targeted at all times in which one of the two clutches 26, 28 is completely disengaged and the respective other of the two clutches 26, 28 of double clutch 10 transmits a defined torque. In this context, reference is made to the fact that the disengaging of both clutches 26 and 28 and thus also the initial drive operation may be regulated in that cam 34 is moved by the second, additional electric drive 40 in translatory direction 44. In particular, the load may be removed from both clutches 26, 28 if cam 34 is pulled away from clutch springs 30 or 32 in translatory direction 44.

However, it is also possible to move cam 34 toward clutch block 18 and in this way to uniformly increase the transmittable torque at both clutches 26 and 28 respectively. By actuating both electric drives 38, 40, it is thus possible to vary the characteristic of the clutch shift operation, which characteristic is fixedly predefined by first lift curve 60 and second lift curve 70 respectively, with regard to an overlapping shift and to regulate it in accordance with the driving status of the vehicle.

It can be gathered from the representation according to FIG. 4 that, starting from a particular angle of first electric drive 38 used for the clutch shift operation, first electric drive 38 transitions from drive mode 90 to an entrainment mode 92. Within entrainment mode 92, first electric drive 38 no longer drives, but rather is carried along.

Figure 5:
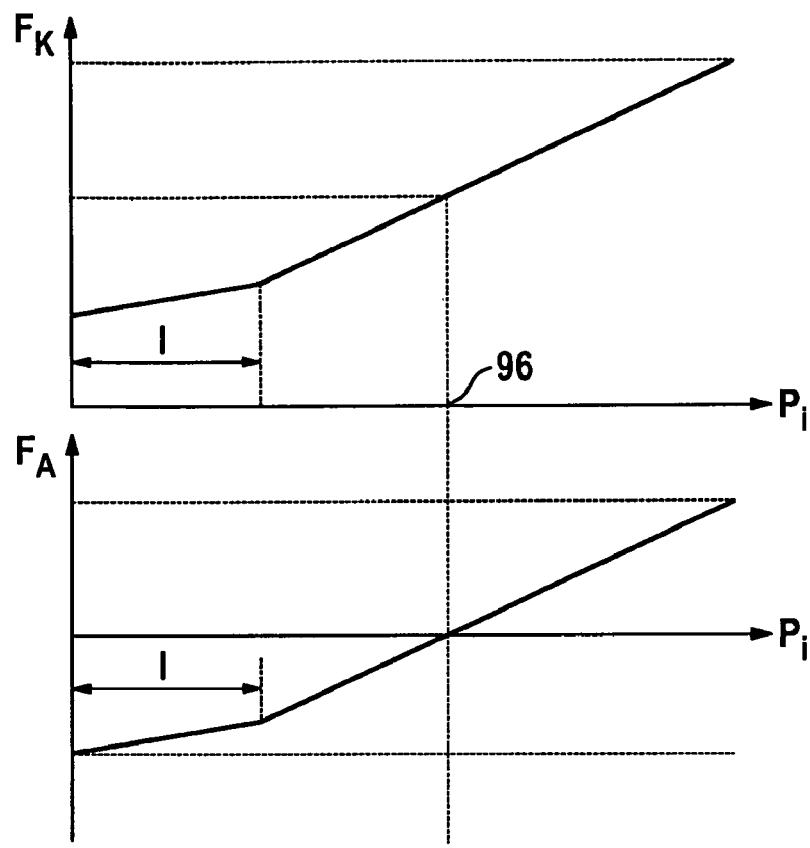
FIG. 5 shows the characteristics of clutch force and actuator force, each plotted over the translatory position of the cam.

In the representation shown in FIG. 5, the characteristics of clutch force $F_K$ and actuator force $F_A$ are respectively plotted over the translatory position of the cam.

In the diagrams shown in FIG. 5, clutch force $F_K$ and actuator force $F_A$ are respectively plotted over different translatory positions $P_i$ of cam 34, which are obtained according to the position targeted by the additional second electric drive 40. It can be gathered from the characteristic of clutch force $F_K$ over translatory positions $P_i$ of cam 34 that a significant increase in clutch force $F_K$ is obtained after traversing empty path 1. Reference symbol 96 labels an initial position of cam 34. On the basis of the initial position represented by reference symbol 96, a reduction or an increase of clutch force $F_K$ may be achieved by a translatory motion 44 of cam 34 over sliding sleeve 36 (compare representation shown in FIG. 1). Depending on the rotational direction in which the second additional electric drive 40 is operated for the translatory adjustment of sliding sleeve 36 and thus of cam 34, negative actuator forces $F_K$ may also arise. The representation in FIG. 5 shows that the actuator forces are reduced by introducing an initial position 96 and thus relieve the additional second electric drive 40. In the unenergized state of the additional second electric drive 40, cam 34 will approach the defined initial position 96 in a translatory manner. In this case, the additional second electric drive 40 no longer generates the full clutch force $F_K$, but rather only the force component in initial position 96 that is required for disengaging, and the force component that is required for transmitting the full clutch torque. Initial position 96 is adjusted via the force relationship between clutch springs 30 and 32 and at least one compression spring 112.

Additionally, it is practical if the full torque is not transmitted in the translatory initial position, shown by reference symbol 96 of cam 34. The acting forces in the double-clutch transmission are lower in normal operation, as is the energy requirement for both electric drives 38 and 40. In this case in the full-load operation, which occurs relatively seldom and in which the full torque must be transmitted, clutch force $F_K$ may be increased by the additional second electric drive 40 via a translatory movement in translation direction 44 by cam 34. Initial position 96 of cam 34 ensures that the entire clutch actuator system in the unenergized state of both first electric drive 38 and second electric drive 40 is in one of two defined secure states achieved by a compression spring 112: Either first clutch 26 is disengaged and second clutch 28 transmits the defined torque, or second clutch 28 is disengaged while first clutch 26 transmits the defined torque.

Figure 6:
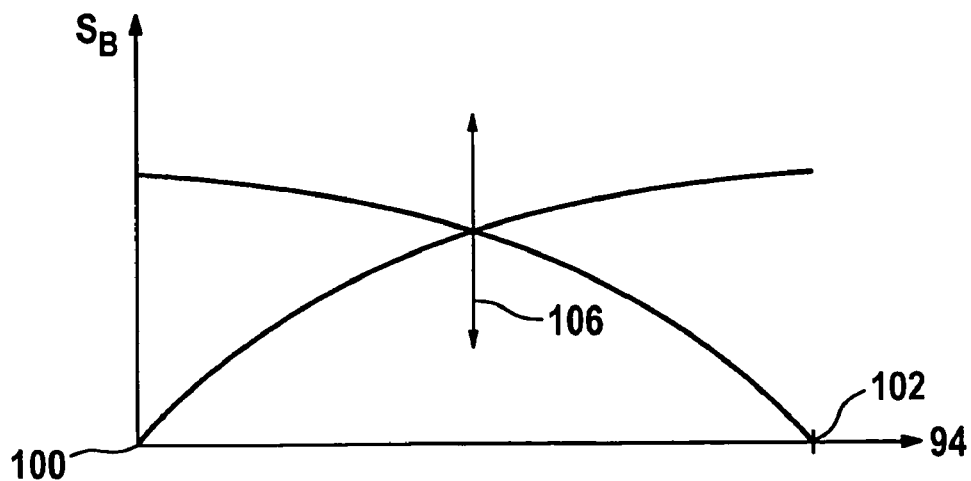
FIG. 6 shows the actuating path of the clutch springs assigned to the two clutches, plotted over the rotational angle of the electric motor that is used for the clutch shift operation.

An example for the characteristic of the lift curves according to the FIGS. 2.1 and 2.2 may be gathered from the representation shown in FIG. 6.

It can be gathered from the representation shown in FIG. 6 that clutch 26 is disengaged and clutch 28 is engaged in end position 100 while reversed relationships prevail in end position 102. If cam 34 is twisted by a rotation 94 of first electric drive 38, one of the two clutches 26 or 28 is respectively engaged while the respective other of the two clutches 26, 28 of double clutch 10 is disengaged. Thus, the transmitted torque of the double-clutch transmission is transmitted from first clutch 26 to second clutch 28 or vice versa via the movement along direction 94. This predefined curve may be varied by shifting cam 34 in translation direction 44 using second electric drive 40 along motion direction 106.

What is claimed is:

1. A double clutch arrangement for a double-clutch transmission, comprising:
   a first clutch and a second clutch; and
   a first electric actuator and a second electric actuator;
   wherein the first electric actuator acts on a cam activating both the first and second clutches, and wherein the first electric actuator controls a clutch shift operation between the first clutch and the second clutch of the double-clutch transmission,
   wherein the cam is configured to be moved: a) in a rotary manner using the first electric actuator; and b) in a translatory manner using the second electric actuator.

2. The double clutch arrangement as recited in claim 1, further comprising:
   a first clutch spring assigned to the first clutch; and
   a second clutch spring assigned to the second clutch;
   wherein, during the clutch shift operation, a stored spring energy in the clutch spring of a clutch being disengaged loads the clutch spring of a clutch being engaged.

3. The double clutch arrangement as recited in claim 1, wherein the cam is mounted on a drive shaft for a first subunit, and wherein the cam is preloaded by at least one compression spring that moves the cam into an initial position.

4. The double clutch arrangement as recited in claim 3, wherein the clutch force $F_K$ acting in the initial position is adjusted by at least one compression spring.

5. The double clutch arrangement as recited in claim 1, wherein the clutch force $F_K$ of the double clutch transmission is increased in a translatory movement of the cam.

6. The double clutch arrangement as recited in claim 1, wherein the cam has a first lift curve assigned to the first clutch and a second lift curve assigned to the second clutch.

7. The double clutch arrangement as recited in claim 6, wherein the first and second lift curves each have multiple segments.

8. The double clutch arrangement as recited in claim 6, wherein the first and second lift curves are configured such that a required activation energy is minimized in that a force required to engage one of the first and second clutches is provided by a disengagement force of the other of the first and second clutches.

9. The double clutch arrangement as recited in claim 6, wherein the first and second lift curves are configured such that two stable end positions are provided for the movement of the cam.

10. The double clutch arrangement as recited in claim 1, wherein, on the basis of a translatory initial position of the cam, the second electric actuator generates one of: a) a disengagement force to disengage one of the first and second clutches; and b) a component of a clutch force that is required for transmitting a full torque along an actuating path.

11. A double clutch arrangement for a double-clutch transmission, comprising:
    a first clutch and a second clutch; and
    a first electric actuator and a second electric actuator;
    wherein the first electric actuator acts on a cam activating both the first and second clutches, and wherein the first electric actuator controls a clutch shift operation between the first clutch and the second clutch of the double-clutch transmission,
    wherein in the event of a malfunction of the first and second electric actuators, one of the first and second clutches disengages and the other of the first and second clutches engages to such an extent that a defined clutch force $F_K$ for transmitting a defined torque of an internal combustion engine is provided on the drive train of the vehicle.

* * * * *